US008689702B2

(12) United States Patent
Ishizuka et al.

(10) Patent No.: US 8,689,702 B2
(45) Date of Patent: Apr. 8, 2014

(54) RAILWAY VEHICLE

(75) Inventors: Takashi Ishizuka, Nagoya (JP); Masaru Kuroda, Nagoya (JP); Koji Nakao, Nagoya (JP); Takamitsu Sassa, Nagoya (JP)

(73) Assignee: Nippon Sharyo, Ltd., Nagoya-Shi (JP)

( * ) Notice: Subject to any disclaimer, the term of this patent is extended or adjusted under 35 U.S.C. 154(b) by 0 days.

(21) Appl. No.: 13/696,938

(22) PCT Filed: Apr. 15, 2011

(86) PCT No.: PCT/JP2011/059336
§ 371 (c)(1),
(2), (4) Date: Jan. 9, 2013

(87) PCT Pub. No.: WO2011/142206
PCT Pub. Date: Nov. 17, 2011

(65) Prior Publication Data
US 2013/0125782 A1 May 23, 2013

(30) Foreign Application Priority Data

May 10, 2010 (JP) .................... 2010-108139
May 10, 2010 (JP) .................... 2010-108145

(51) Int. Cl.
*B61D 25/00* (2006.01)
(52) U.S. Cl.
USPC .......................... 105/396; 105/397
(58) Field of Classification Search
USPC ............................... 105/396–404
See application file for complete search history.

(56) References Cited

U.S. PATENT DOCUMENTS

| 1,977,468 | A | | 10/1934 | Brewer |
| 2,101,557 | A | | 12/1937 | Mussey et al. |
| 2,257,084 | A | | 9/1941 | Dean |
| 2,294,357 | A | * | 8/1942 | Dean et al. ............. 105/397 |

(Continued)

FOREIGN PATENT DOCUMENTS

| DE | 749895 C | 12/1944 |
| GB | 361425 A | 11/1931 |

(Continued)

OTHER PUBLICATIONS

International Search Report dated Jul. 19, 2011, issued for PCT/JP2011/059336.

(Continued)

*Primary Examiner* — Jason C Smith
(74) *Attorney, Agent, or Firm* — Edwards Wildman Palmer LLP; James E. Armstrong, IV; George N. Chaclas

(57) ABSTRACT

Provided is a railway vehicle having a configuration which can sufficiently protect the cabin even when large external force is applied to the side structures and the end structures thereof. The vehicle body of the railway vehicle is formed by joining an underframe 20, side structures 30, end structures 50, and a roof structure 60 together. The lower inner face of the side post 31 of the side structure is joined to the outer face portion of a side beam 21 of the underframe. The lower inner faces of the post reinforcement members (an end post reinforcement member 57 and a corner post reinforcement member 58) for reinforcing the post members (an end post 53 and a corner post 54) of the end structure are joined to the outer face portion of an end beam 26 of the underframe.

18 Claims, 17 Drawing Sheets

(56) References Cited

U.S. PATENT DOCUMENTS

| | | | |
|---|---|---|---|
| 2,519,018 A | 8/1950 | Blomberg | |
| 3,911,833 A * | 10/1975 | Bauer | 105/402 |
| 4,211,173 A | 7/1980 | Eggert, Jr. | |
| 4,222,335 A * | 9/1980 | McQueston et al. | 105/327 |
| 4,235,170 A * | 11/1980 | Bauer | 105/402 |
| 4,353,313 A * | 10/1982 | Panagin | 105/397 |
| 2005/0087097 A1* | 4/2005 | Johnson | 105/406.1 |
| 2007/0295240 A1* | 12/2007 | Campus | 105/396 |
| 2010/0077935 A1* | 4/2010 | Harada et al. | 105/397 |
| 2010/0089283 A1* | 4/2010 | Kono et al. | 105/397 |
| 2010/0132589 A1* | 6/2010 | Harada et al. | 105/397 |
| 2011/0203481 A1* | 8/2011 | Komaki et al. | 105/396 |
| 2012/0042805 A1* | 2/2012 | Umebayashi et al. | 105/396 |
| 2012/0067247 A1* | 3/2012 | Umebayashi et al. | 105/396 |
| 2013/0036937 A1* | 2/2013 | Nedelik | 105/396 |
| 2013/0098264 A1* | 4/2013 | Kuroda et al. | 105/392.5 |
| 2013/0104770 A1* | 5/2013 | Nakao et al. | 105/392.5 |
| 2013/0125782 A1* | 5/2013 | Ishizuka et al. | 105/392.5 |

FOREIGN PATENT DOCUMENTS

| | | | |
|---|---|---|---|
| JP | 38-27117 Y1 | 12/1963 | |
| JP | 54-110507 A | 8/1979 | |
| JP | 55-063964 A | 5/1980 | |
| JP | 61-43574 U | 3/1986 | |
| JP | 62-074758 A | 4/1987 | |
| JP | 2001-048016 A | 2/2001 | |
| JP | 2011-235728 A | 11/2011 | |
| JP | 2011-235730 A | 11/2011 | |
| JP | 2011-235731 A | 11/2011 | |
| JP | 2011-235732 A | 11/2011 | |

OTHER PUBLICATIONS

Japanese Office Action dated Nov. 13, 2012, in corresponding Japanese Patent Application No. 2010-108139 (English language translation provided).

Japanese Office Action dated Nov. 13, 2012, in corresponding Japanese Application No. 2010-108145 (English translation provided).

Decision of Refusal dated Mar. 19, 2013 in corresponding Japanese Patent Application No. 2010-108139.

Decision of Refusal dated Mar. 19, 2013 in corresponding Japanese Application No. 2010-108145.

\* cited by examiner

# RAILWAY VEHICLE

CROSS REFERENCE TO RELATED APPLICATIONS

This application is related to three co-pending applications: "RAILWAY VEHICLE" filed even date herewith in the names of Koji Nakao, Kentaro Hayashi, Takashi Ishizuka and Masaru Kuroda as a national phase entry of PCT/JP2011/059339 and "RAILWAY VEHICLE" filed even date herewith in the names of Masaru Kuroda, Koji Nakao, Kentaro Hayashi and Takashi Ishizuka as a national phase entry of PCT/JP2011/059338; which applications are assigned to the assignee of the present application and incorporated by reference herein.

TECHNICAL FIELD

The present invention relates to a railway vehicle, particularly, a railway vehicle which can protect a cabin from a shock caused by a collision, or derailment and overturn.

BACKGROUND ART

A vehicle body of a railway vehicle is configured by joining side structures and end structures to the four side portions of an underframe, respectively, joining a roof structure to the upper portions of the side structures and the end structures, and disposing outer plates, floor boards, interior materials, doors, and windows, on the respective structures. In a conventional railway vehicle, as countermeasures for collisions, the end structures and the underframe portion are reinforced, and shock absorption members are disposed, thereby protecting the cabin (e.g., refer to Patent Literature 1).

CITATION LIST

Patent Literature

Patent Literature 1: Japanese Patent Application Laid-Open No. 2001-48016

SUMMARY OF INVENTION

Technical Problem

However, when large external force is applied to the side structures or the end structures due to a collision etc., the side structures and the end structures may be greatly deformed or damaged so that the cabin cannot be sufficiently protected.

Then, the present invention is intended to provide a railway vehicle having a configuration which can sufficiently protect the cabin even when large external force is applied to the side structure or the end structure.

Solution to Problem

In order to achieve the above-mentioned object, the railway vehicle of the present invention is configured by joining an underframe, side structures, end structures, and a roof structure, so as to form a vehicle body, wherein a lower inner face of a post member of the side structure or the end structure is joined to an outer face portion of the underframe.

Moreover, in the railway vehicle of the present invention, the post member is a side post of the side structure which is joined to a side beam of the underframe, or a post member of the end structure which is joined to an end beam of the underframe.

The post member is a post reinforcement member for reinforcing the post member of the end structure which is joined to the end beam of the underframe. The post reinforcement member has height which is ½ with respect to the height of the post member of the end structure.

A projecting piece is disposed on the outer face side of the underframe so as to project toward an outside of the vehicle body. The lower end of the post member is joined to the upper face portion of the projecting piece.

A projecting piece is disposed so as to project from an intermediate position in the vertical directions on the outer face side of the underframe toward the outside of the vehicle body. A slit is disposed in the projecting piece so as to penetrate into the lower portion of the post member. The lower end portion of the post member is joined to the outer face portion of the underframe through the slit.

Advantageous Effects of Invention

According to the railway vehicle of the present invention, because the lower end portions of the post members of the side structures and the end structures are joined to the outer face portions of the side beams and the end beams of the underframe, the joining strength between the lower ends of the post members and the side beams or the end beams can be enhanced. Accordingly, the external force applied to the side structure and the end structure can be surely born by the underframe through the lower end portion of the post member, so that deformations of the side structure and the end structure toward the inside of the vehicle body can be suppressed.

Moreover, a projecting piece projecting toward the outside of the vehicle body may be disposed on the outer face side of the underframe, and the lower end of the post member may be joined to the upper face portion of the projecting piece. Or, the lower end portion of the post member may be joined to the outer face portion of the underframe through a slit formed in the projecting piece. With this, the joining strength therebetween can be further enhanced, and the external force applied from above to the post member can be also born by the underframe.

DESCRIPTION OF EMBODIMENT

Figure 1:
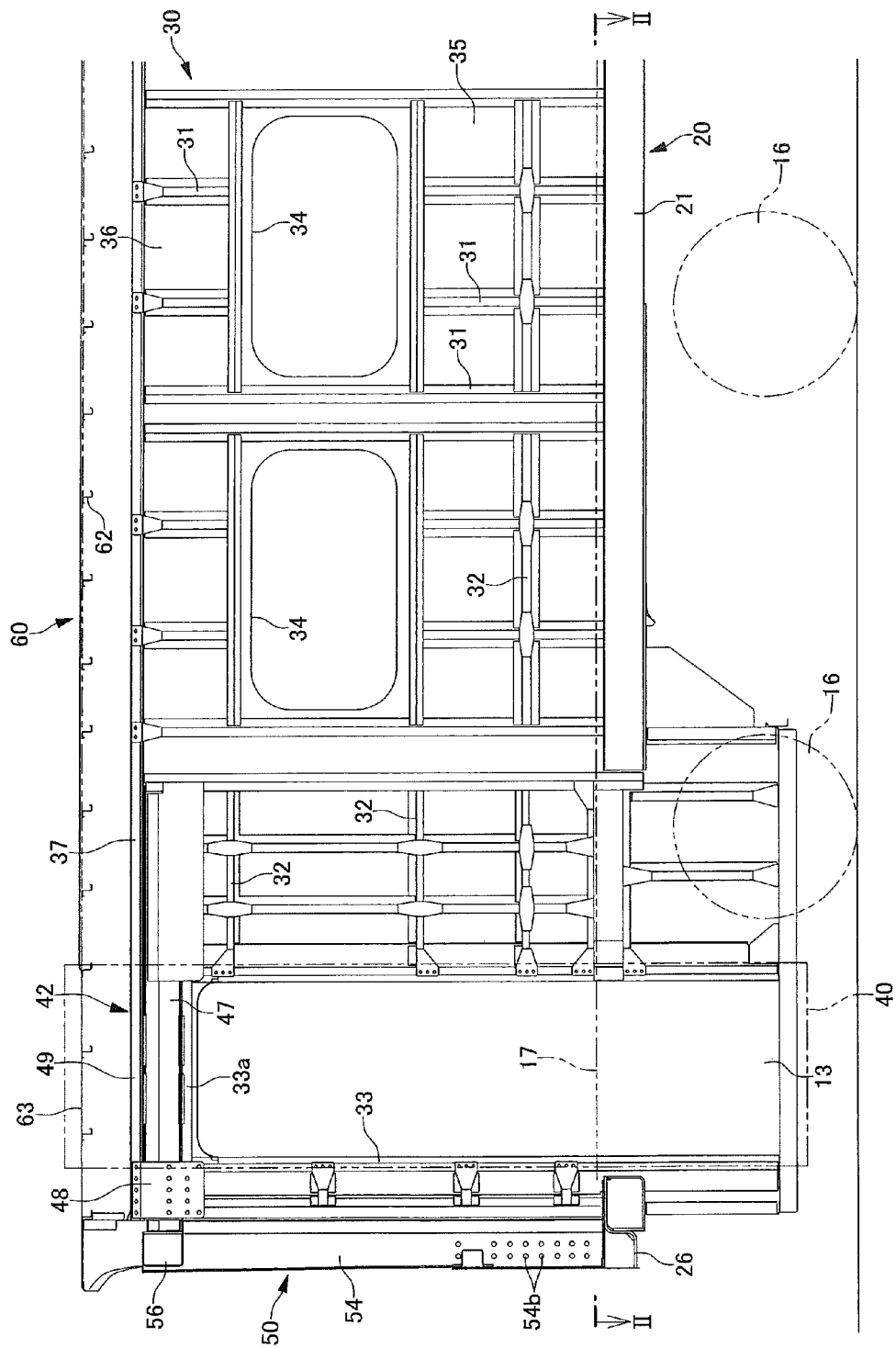
FIG. 1 is a side view of a vehicle structure illustrating an embodiment of the present invention.
Figure 2:
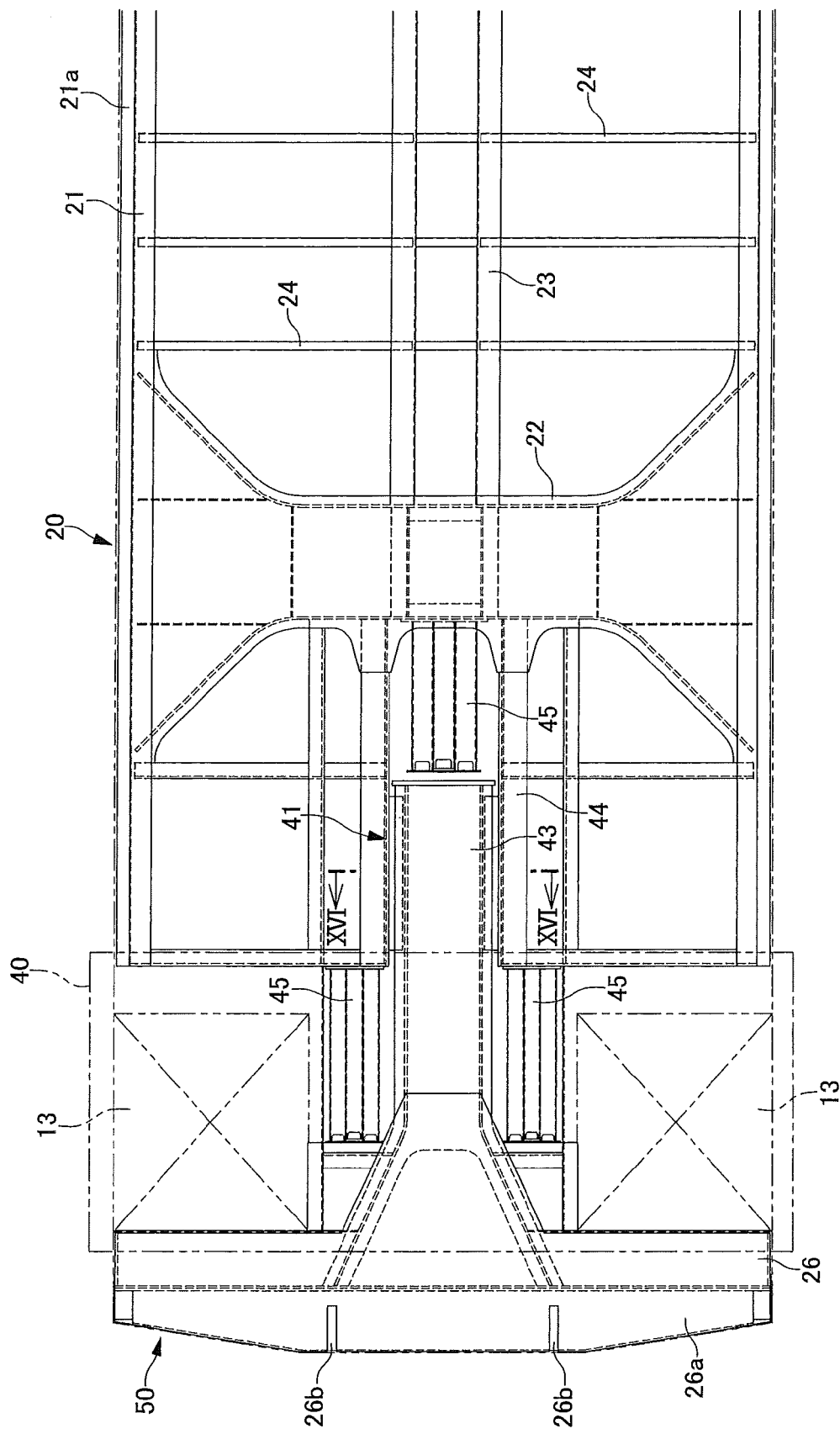
FIG. 2 is a II-II cross-sectional view of FIG. 1.
Figure 3:
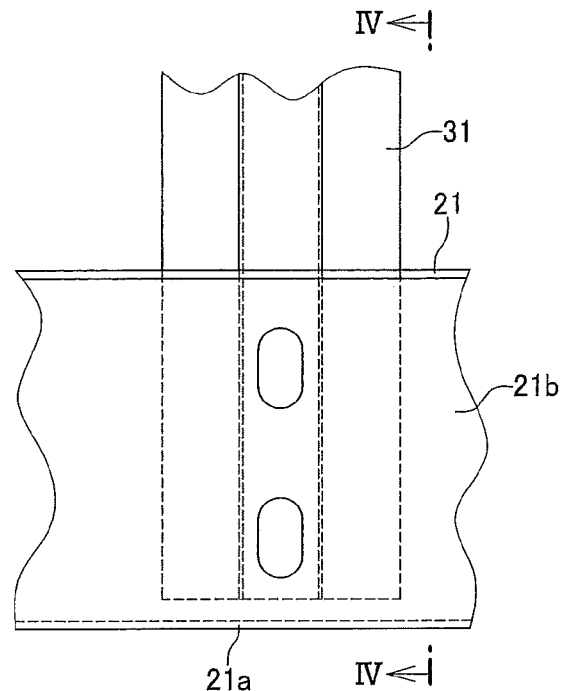
FIG. 3 is an explanatory diagram of a main portion illustrating a joining state between a side post and an underframe.
Figure 4:
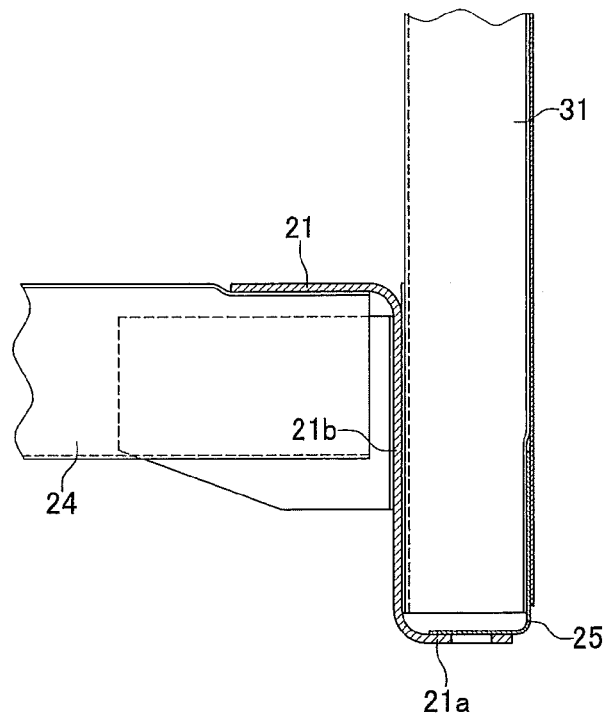
FIG. 4 is a IV-IV cross-sectional view of FIG. 3.
Figure 5:
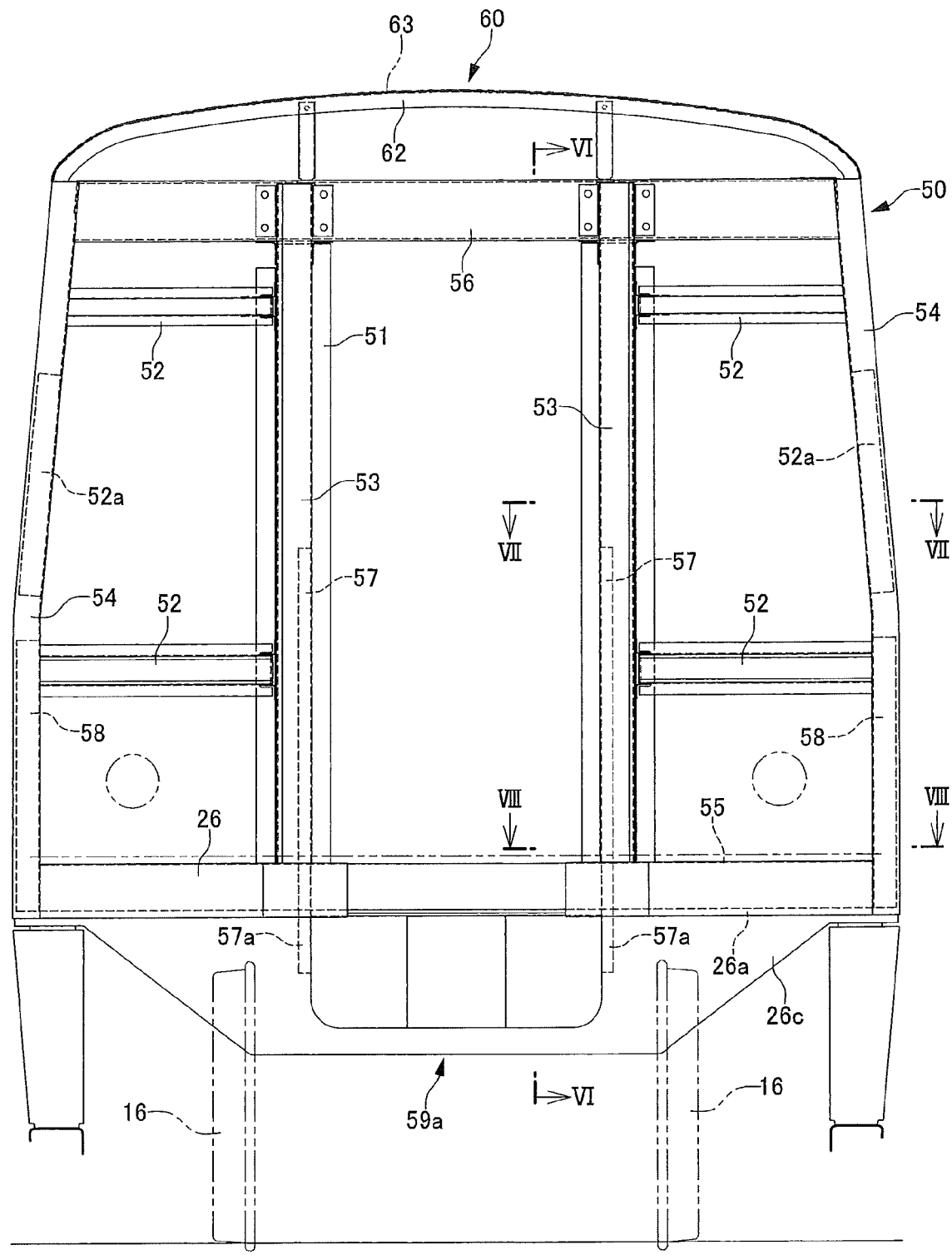
FIG. 5 is a front view of the vehicle structure.
Figure 6:
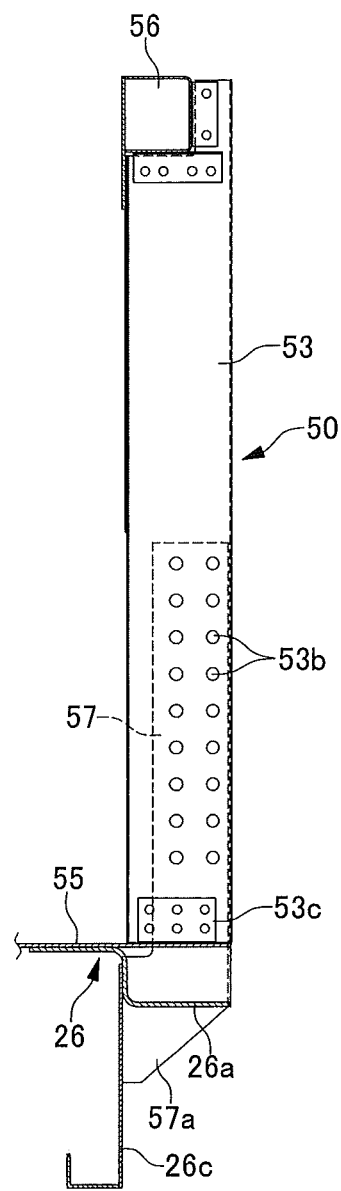
FIG. 6 is a VI-VI cross-sectional view of FIG. 5.
Figure 7:
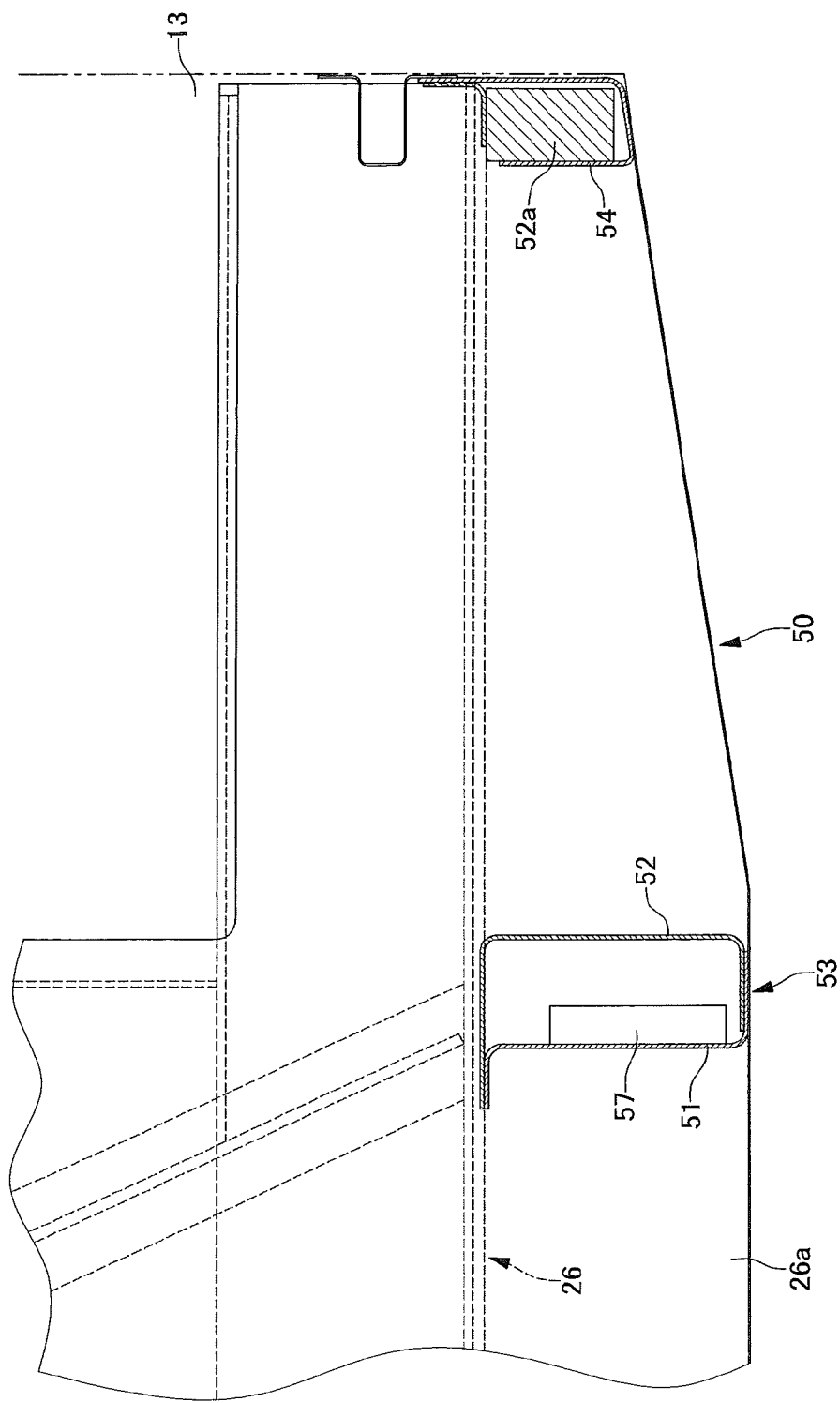
FIG. 7 is a VII-VII cross-sectional view of FIG. 5.
Figure 8:
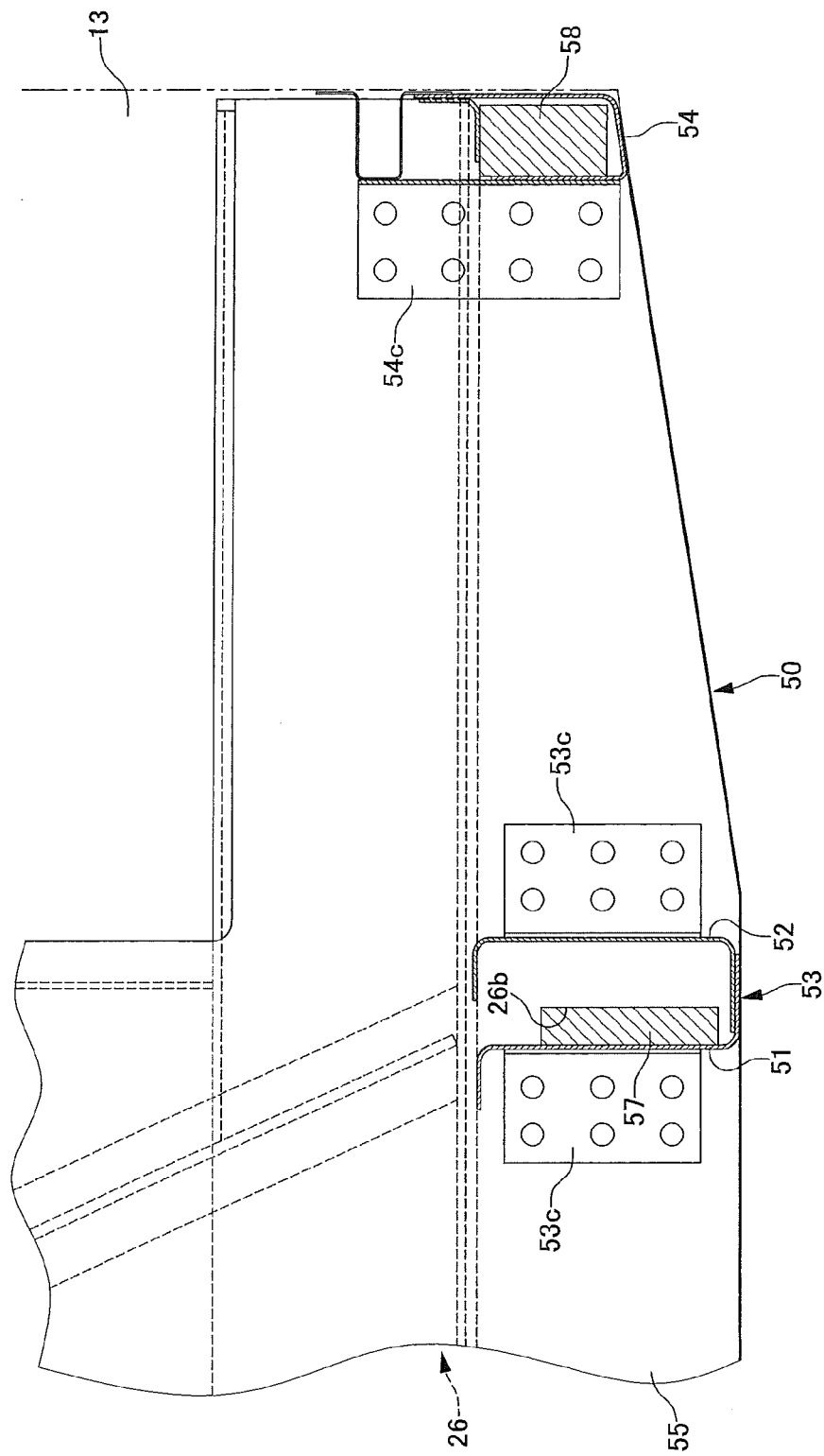
FIG. 8 is a VIII-VIII cross-sectional view of FIG. 5.
Figure 9:
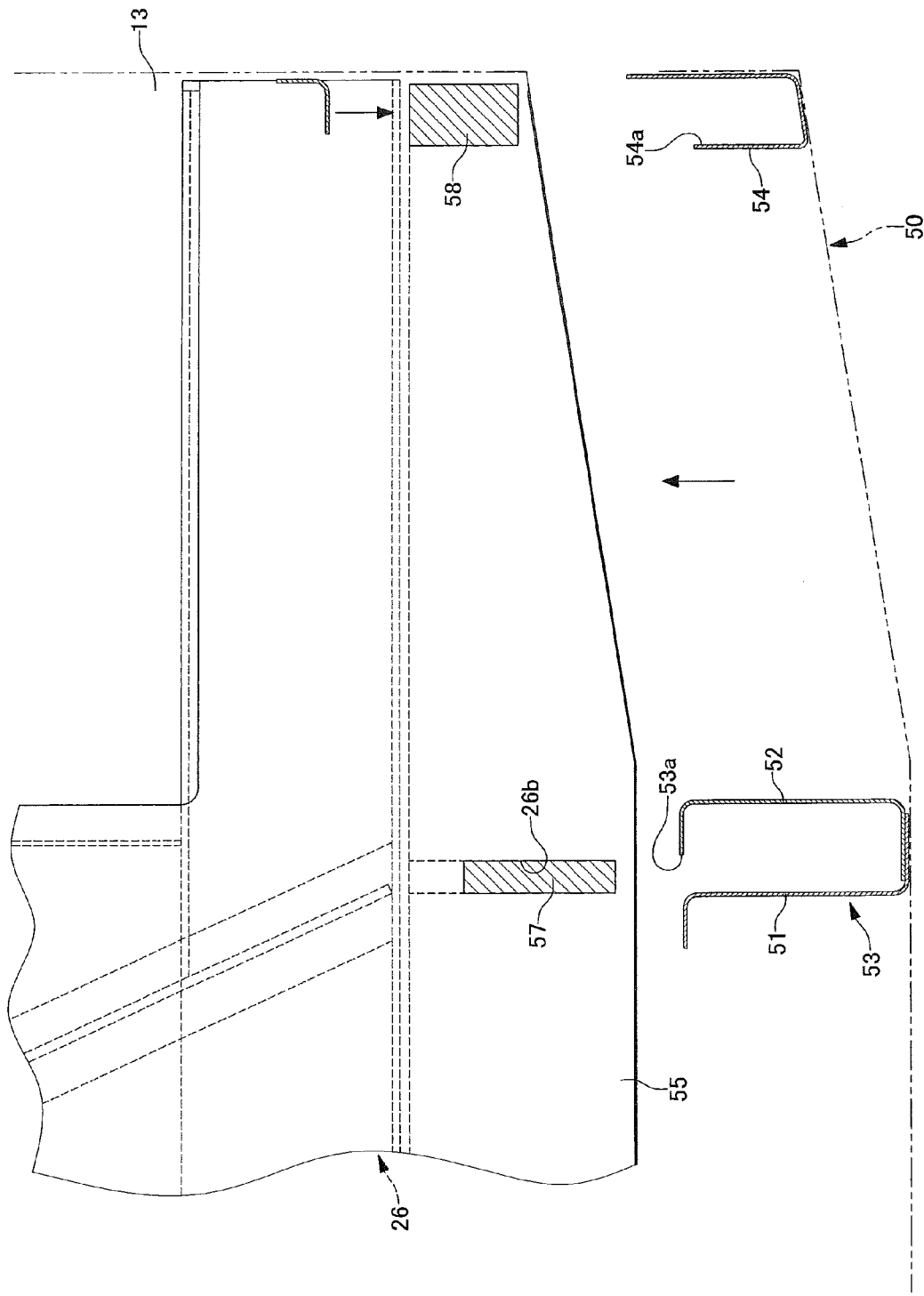
FIG. 9 is an explanatory diagram illustrating a state of assembling between an end post and a post reinforcement member, and between a corner post and a post reinforcement member.
Figure 10:
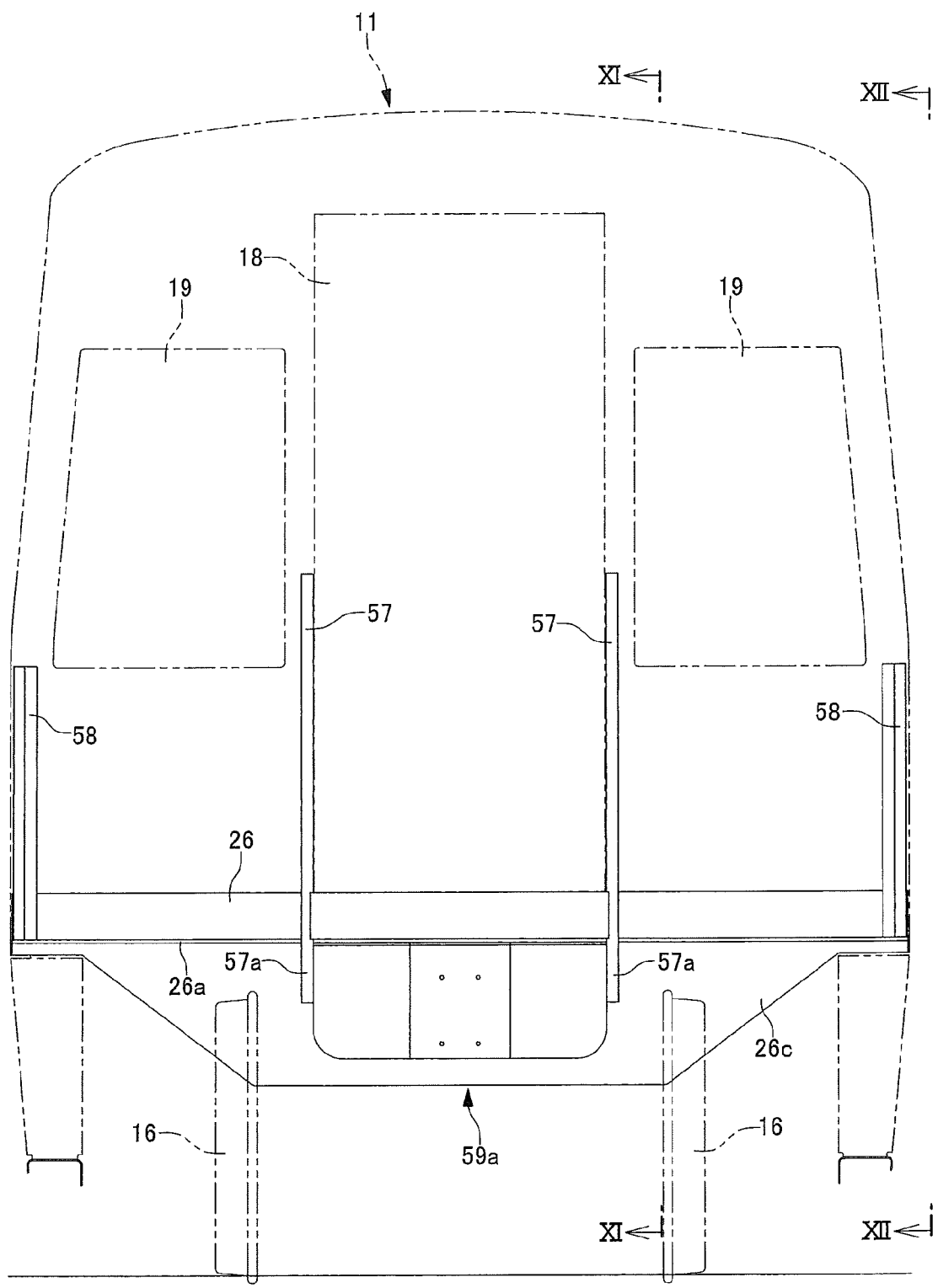
FIG. 10 is a front view of the underframe of the vehicle structure.
Figure 11:
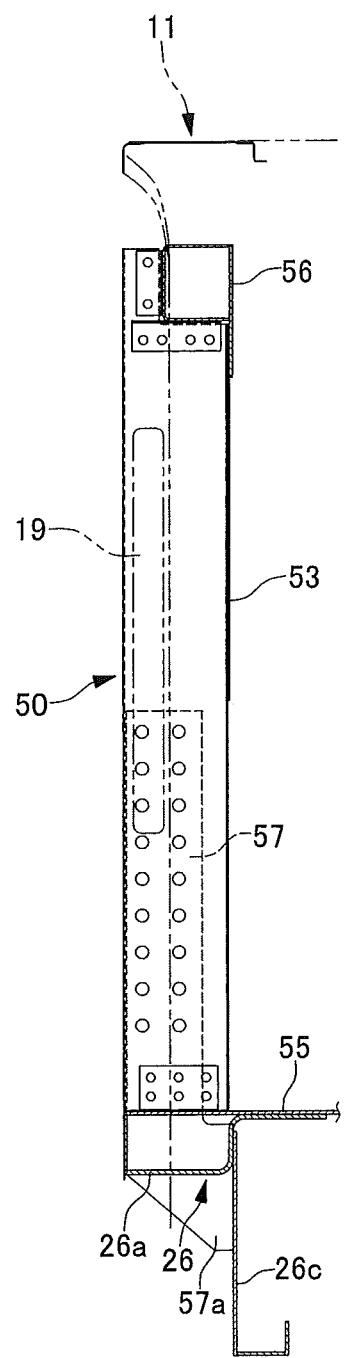
FIG. 11 is a XI-XI cross-sectional view of FIG. 10.
Figure 12:
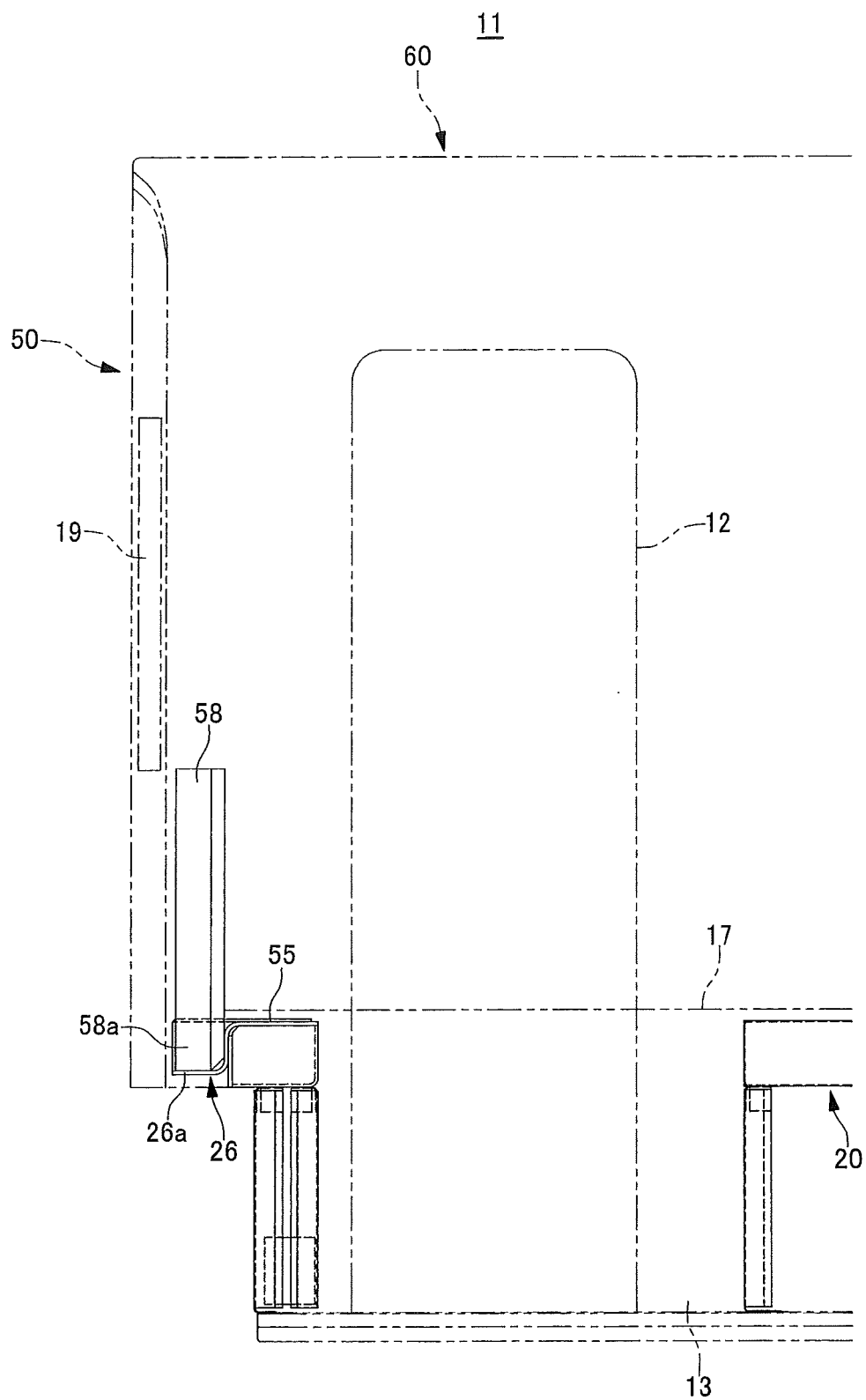
FIG. 12 is a XII-XII cross-sectional view of FIG. 10.
Figure 13:
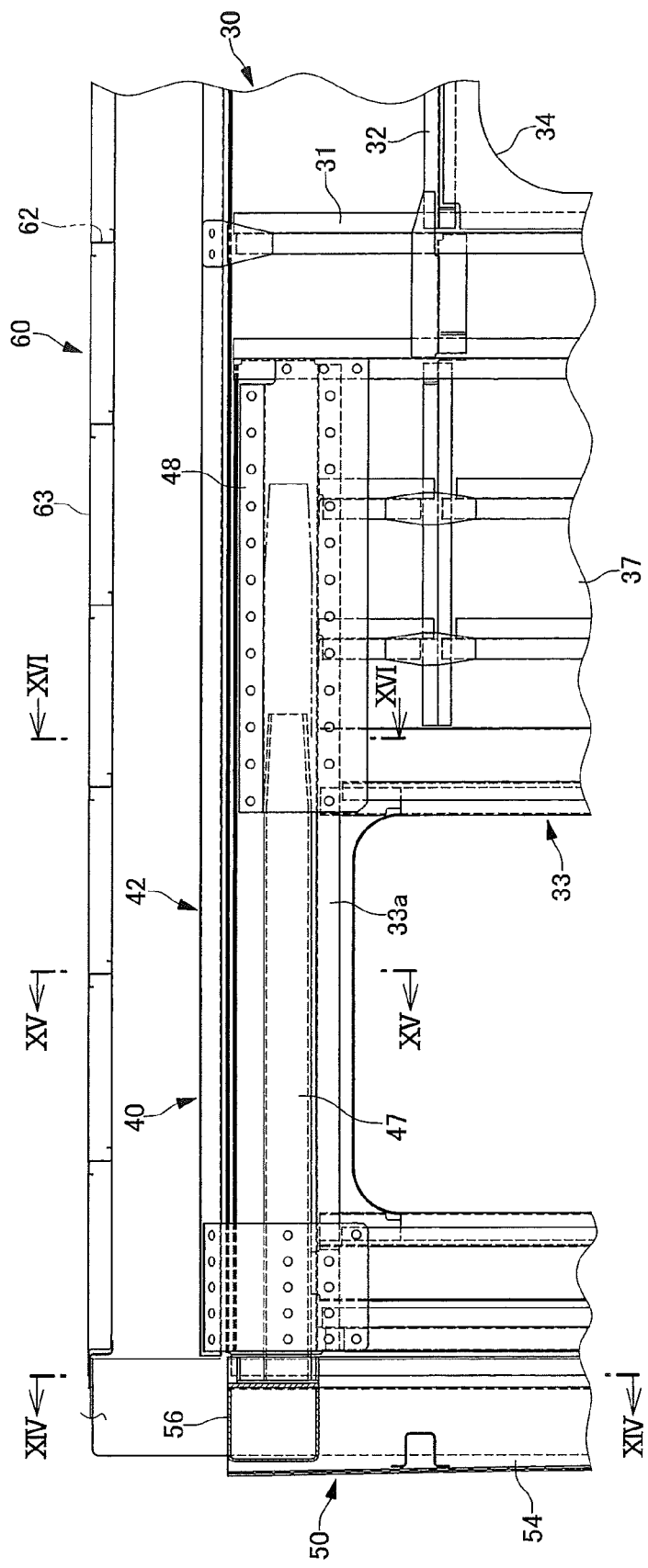
FIG. 13 is a side view of a main portion of the vehicle structure.
Figure 14:
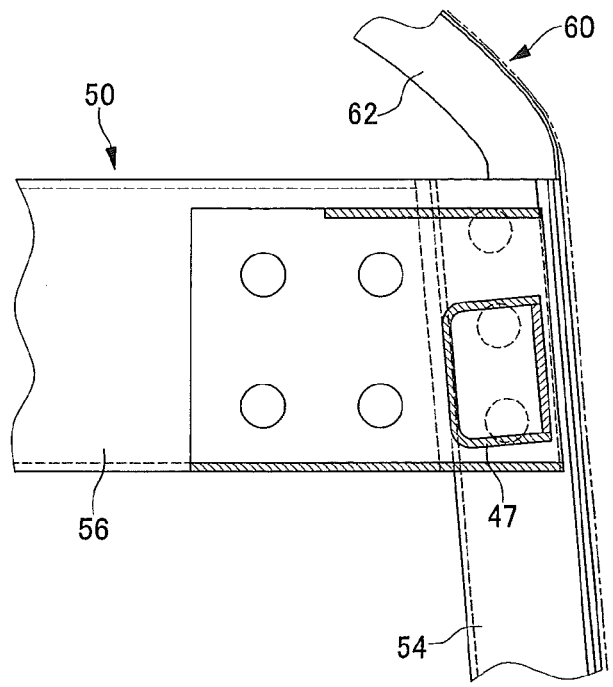
FIG. 14 is a XIV-XIV cross-sectional view of FIG. 13.
Figure 15:
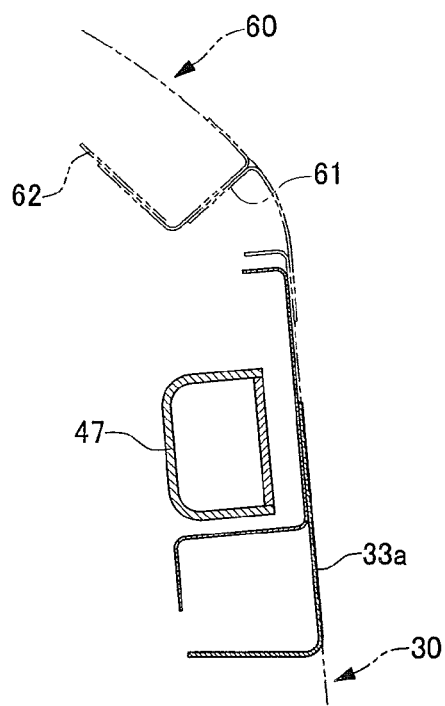
FIG. 15 is a XV-XV cross-sectional view of FIG. 13.
Figure 16:
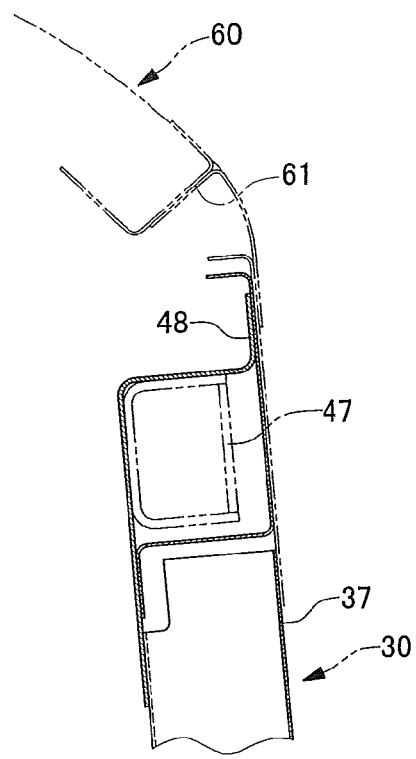
FIG. 16 is a XVI-XVI cross-sectional view of FIG. 13.
Figure 17:
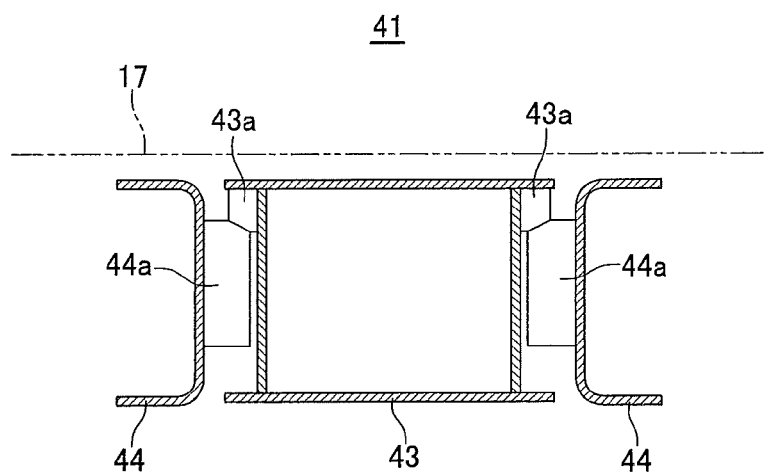
FIG. 17 is a cross-sectional view of a main portion of a lower slide portion.
Figure 18:
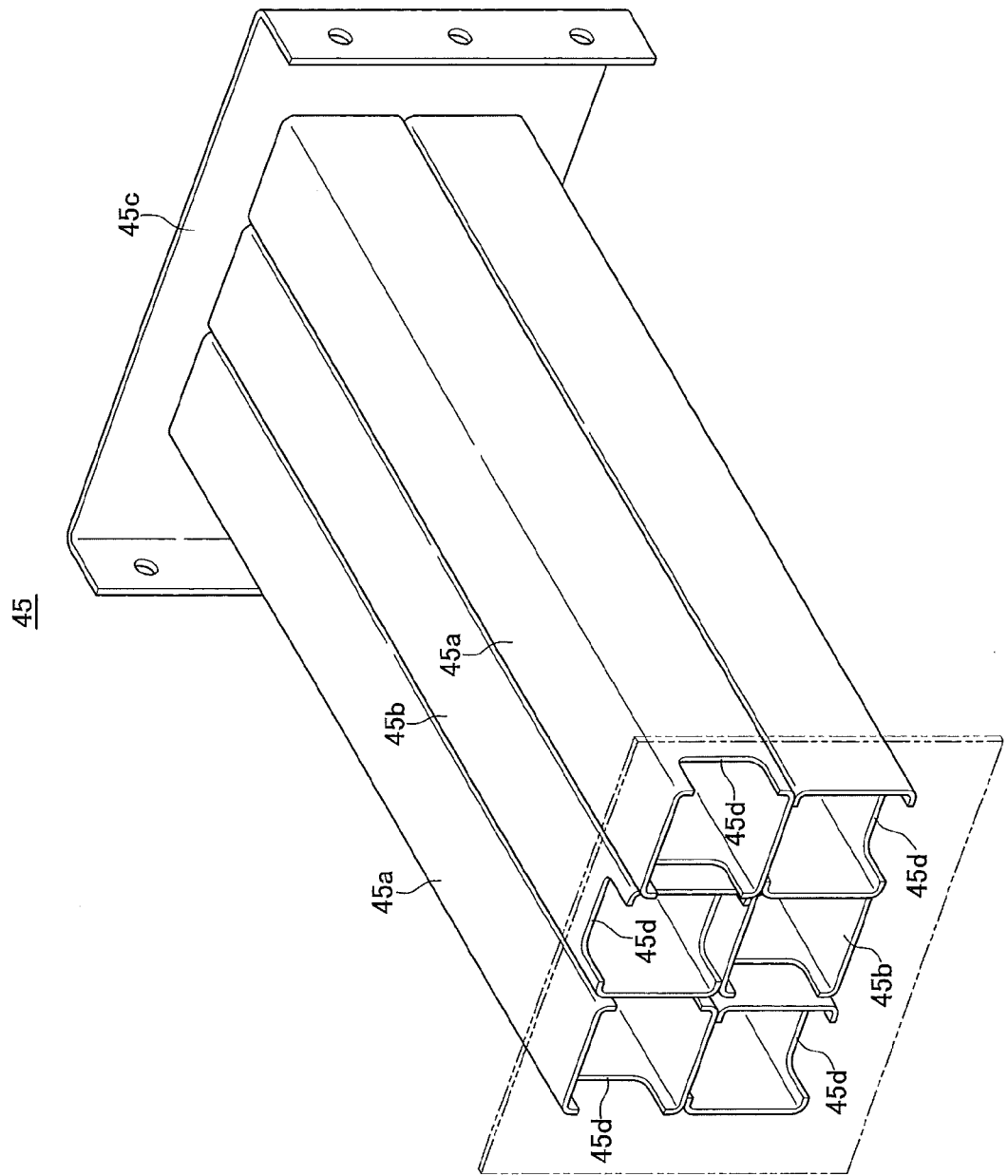
FIG. 18 is a perspective view of a shock absorption member.
Figure 19:
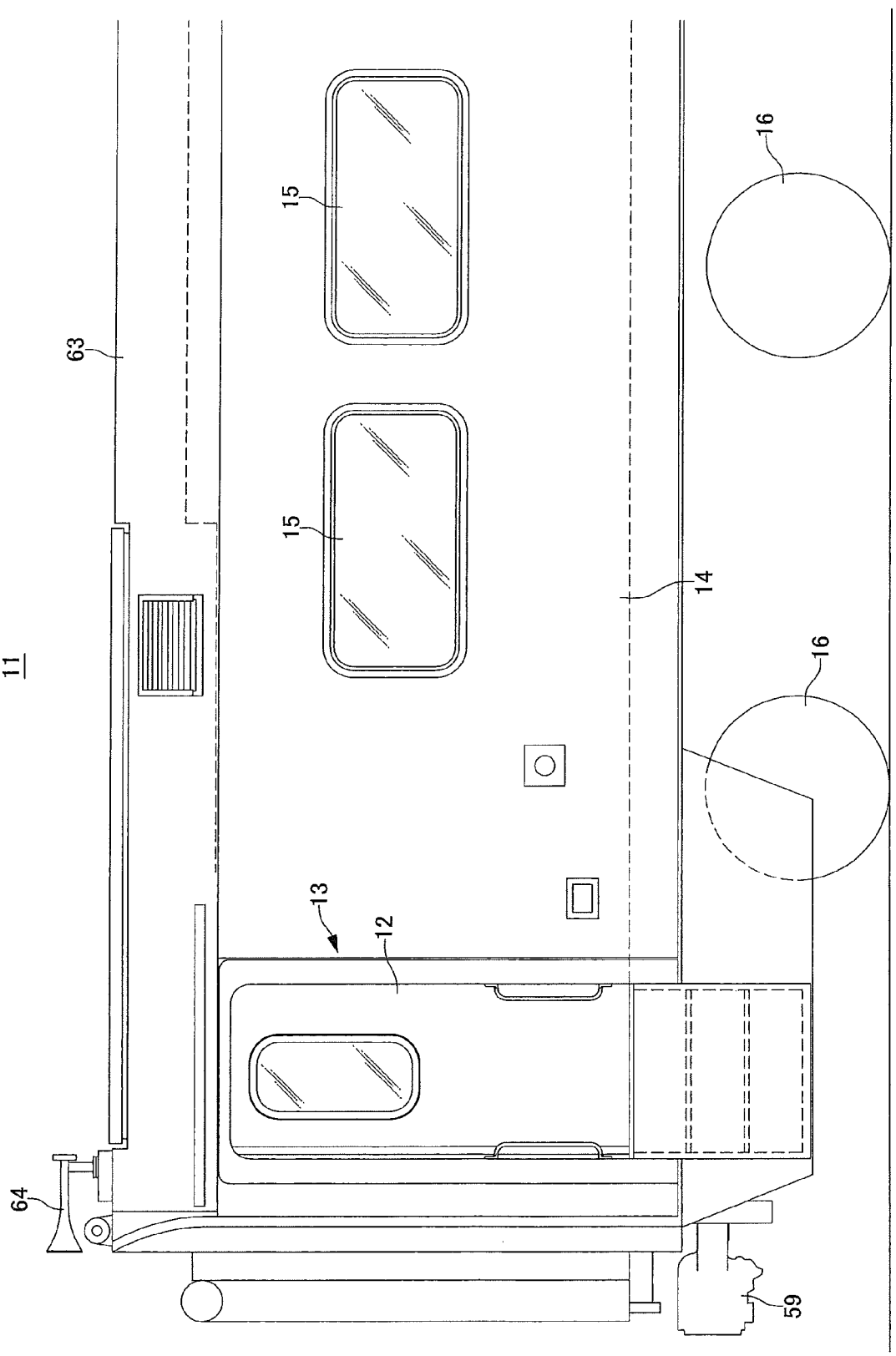
FIG. 19 is a side view of a railway vehicle.
Figure 20:
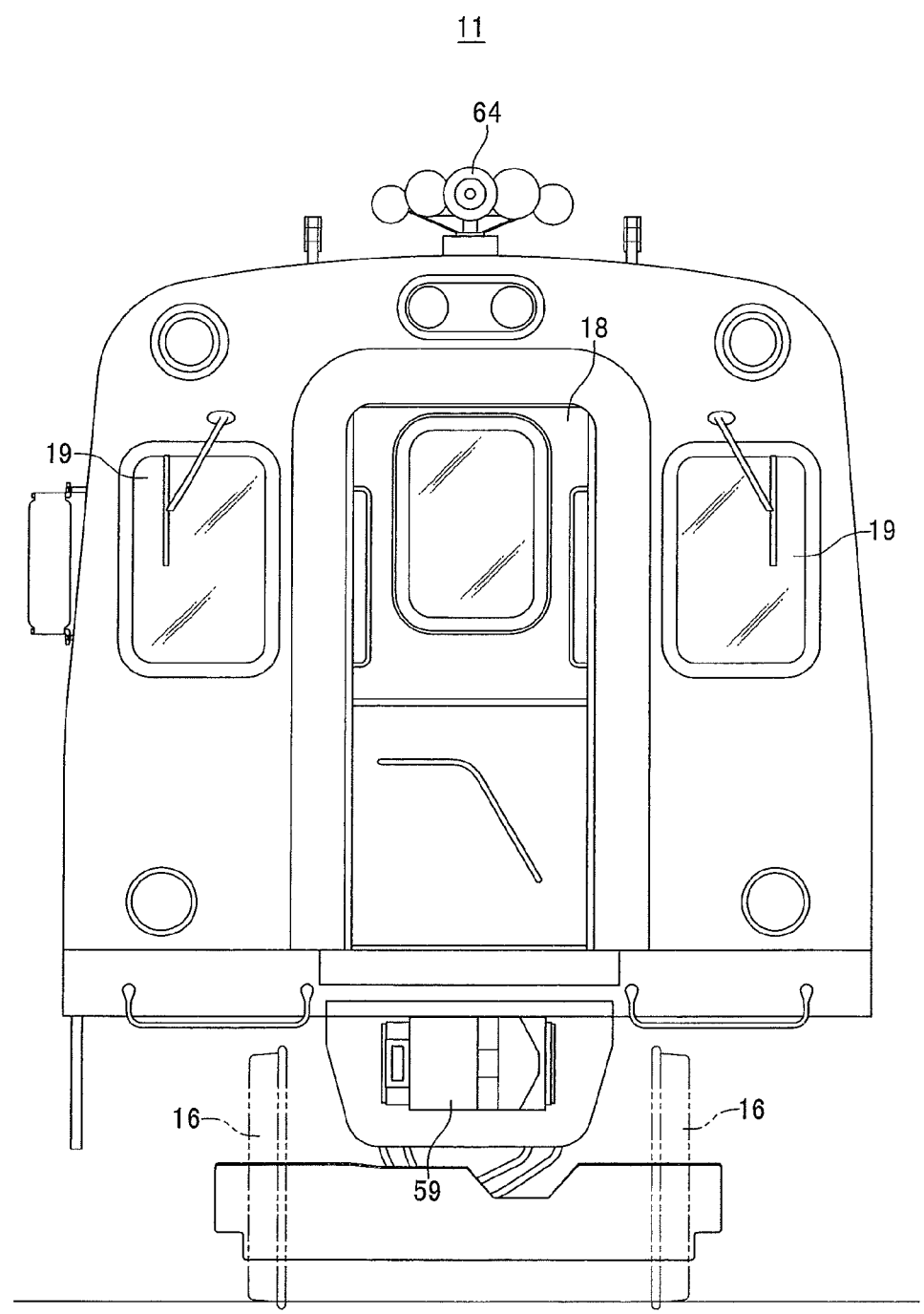
FIG. 20 is a front view of the railway vehicle.

A vehicle body 11 of a railway vehicle as described in the present embodiment is provided with an underframe 20, a pair of right and left side structures 30 disposed on both sides of the underframe 20 in the longitudinal directions, end structures 50 disposed on the end portions of the vehicle body 11 through crushable zones 40, and a roof structure 60 disposed so as to cover the upper portions of the side structures 30 and the end structures 50. At both front and rear end portions of the side faces of the vehicle body 11, vestibules 13 having passenger doors 12 are respectively disposed, and a cabin 14 is disposed between the vestibules 13 at both ends. A plurality of side window 15 are disposed on the side walls of the cabin 14, and interior materials and seats are disposed in the cabin 14.

The underframe 20 includes a pair of right and left side beams 21 disposed in the rail directions, center beams 23 and transverse beams 24 for reinforcement, and a pair of front and rear cap beams 22 disposed in the railroad tie directions at both front and rear end portions of the center beams 23. At the lower portion of the cap beam 22, a truck provided with wheels 16 is disposed, and a floor board 17 is disposed at the upper portion of the underframe 20. The side beam 21 is a member having a Z-shaped cross-section, and includes a projecting piece 21a which projects in the horizontal direction toward the outside of the vehicle body from the lower end portion of the side beam 21.

The side structure 30 is provided with a plurality of side posts 31 in the vertical directions, a plurality of frame members 32 in the front and back directions of the vehicle body, door frame portions 33 in which the passenger doors 12 are disposed, window frame portions 34 in which the side windows 15 are disposed, wainscot panels 35 disposed at the lower portions of the side windows 15, skin panels 36 disposed at the upper portions of the side windows 15, and door pocket portions 37 disposed on the cabin sides of the door frame portions 33. The lower end of the side post 31 is joined to the upper face portion of the projecting piece 21a which is disposed at the side beam 21 through a rocker rail 25, and the outer face portion 21b of the side beam 21 is joined to the lower inner face of the side post 31.

The roof structure 60 is formed by a pair of cant rails 61 which are respectively disposed on both sides in the rail directions, a plurality of rafters 62 in the railroad tie directions which are orthogonally joined to the cant rails 61, and a shingle 63 joined to the outside of the rafters 62. Both ends of the cant rail 61 are joined to the upper portions of the end structures 50, and both ends of the rafter 62 are joined to the upper ends of the side structures 30 through the cant rails 61. The shingle 63 is formed so as to have a curved face gently projecting upward, and instruments, such as a horn 64, are disposed on the roof as appropriate.

The end structure 50 includes an opening frame portion for door 51 for a connecting door 18 which is disposed at the center in the width direction, and opening frame portions for windows 52 for front face windows (end face windows) 19 which are respectively disposed on the right and left of the connecting door 18. A pair of end posts (central portion collision posts) 53 are respectively disposed between the opening frame portion for door 51 and each of the opening frame portions for windows 52. A pair of corner posts (end portion collision posts) 54 are respectively disposed at the outsides of the opening frame portions for windows 52 which are both end portions in the end structure width directions. At the central portion in the vertical directions of this corner post 54, a reinforcement member 52a is disposed in order to enhance the rigidity of the side portion of the end face window 19. The lower portion of the end structure 50 is rigidly joined through the end post reinforcement members 57 and corner post reinforcement members 58 to the end beam 26 disposed at each of both front and rear ends of the underframe 20 and is integrally formed therewith. Moreover, at the upper portion of the end structure 50, an upper reinforcement beam 56 is disposed in the railroad tie directions under a state of being independent from the portion joined with the roof structure 60.

A sweep-back angle toward the side is formed at the front face window 19, and the planar view of the outer face (end face) of the end structure 50 is formed in a triangle folded end shape whose connecting door 18 portion projects. The side face upper half portion of the end structure 50 is inclined toward the inside of the vehicle body, similar to the side structures 30.

The end beam 26 is formed in a Z-shaped cross-section. The upper face portion thereof toward the inside of the vehicle body is provided with an upper face plate 55. The distal end of the lower projecting piece 26a horizontally projecting toward the outside of the vehicle body is formed in a shape corresponding to the triangle folded end shape of the end structure 50. With this, there is no need to perform a process for folding the entire end beam 26 so as to correspond to the shape of the end structure 50. In addition to this, the end post reinforcement member 57 and the corner post reinforcement member 58 can be rigidly fixed by welding to the end beam 26 by the projecting piece 26a.

At the positions of the end beam 26 corresponding to the end posts 53, a pair of end post reinforcement members 57 each having height of about ½ of that of the end post 53 are respectively disposed. At the positions of both end portions of the end beam 26 corresponding to the corner posts 54, a pair of corner post reinforcement members 58 each having length reaching the lower frame portion of the opening frame portion for window 52 are respectively disposed. At the lower portion of the end beam 26, a coupler support frame 59a for supporting a coupler 59 is disposed.

The lower portion 57a of the end post reinforcement member 57 is joined to the outer faces of the end beam 26 and the end beam lower member 26c through the slits 26b which are formed in the upper face plate 55 and the projecting piece 26a, respectively. The lower end of the lower portion 58a of the corner post reinforcement member 58 is joined to the upper face of the projecting piece 26a, and the side face of the lower end portion thereof is joined to the outer face of the end beam 26. Thus, the end post reinforcement member 57 and the corner post reinforcement member 58 are joined to the outer face of the end beam 26 so that the end post reinforcement member 57 and the corner post reinforcement member 58 can be rigidly joined to the end beam 26, and external force applied to the end post reinforcement member 57 and the corner post reinforcement member 58 can be born by the end beam 26.

Moreover, the end post reinforcement member 57 and the end post 53 are joined to each other, and the corner post reinforcement member 58 and the corner post 54 are joined to each other, so that the end post 53 and the corner post 54 can be joined to the underframe 20 with sufficient joining strength against shearing force and bending moment caused at the respective joined portions of the end post 53 and the corner post 54 by external force applied to all vertical positions of the end post 53 and the corner post 54. Moreover, the height of each of the post reinforcement members 57, 58 is set to the height of about ½ of the height of the end post 53 or the corner post 54 so that loads applied to all vertical positions of the end post 53 and the corner post 54 can be effectively born, and sufficient joining strength with the underframe 20 can be held.

At the vehicle body inner sides of the end post 53 and the corner post 54, there are respectively provided openings 53*a*, 54*a* through which the respective post reinforcement members 57, 58 can pass. The end post 53 and the corner post 54 are assembled with the respective post reinforcement members 57, 58 by inserting the respective post reinforcement members 57, 58 into the insides of the end post 53 and the corner post 54 through the openings 53*a*, 54*a* of the end post 53 and the corner post 54 which have been preliminary assembled into the end structure 50. The end post 53 and the corner post 54 are joined to the respective post reinforcement members 57, 58 by welding the inner circumferences of a plurality of joining holes 53*b*, 54*b* disposed on the side faces of the end post 53 and the corner post 54 and the side faces of the respective post reinforcement members 57, 58. Moreover, reinforcement angle 53*c*, 54*c* are joined and connected between the lower end potions of the end post 53 and the corner post 54 and the upper face plate 55.

At the upper portions of the end post 53 and the corner post 54, the outer sides of the end post 53 and the corner post 54 are extended upward, and these extended portions are disposed on the outer face of the upper reinforcement beam 56 so as to be joined thereto, respectively. Namely, the end beam 26 and the upper reinforcement beam 56 are connected by the end posts 53 and the corner posts 54 which are joined to their outer faces, so that the overall rigidity of the end structure 50 is enhanced by assembling in a frame the end beam 26, the upper reinforcement beam 56, a pair of end posts 53, and a pair of corner posts 54. Moreover, the post reinforcement members 57, 58 are respectively disposed at the lower portions of the end post 53 and the corner posts 54, and the lower portions of the respective post reinforcement members 57, 58 are joined to the outer face of the end beam 26, so that the rigidity of the end structure 50 is further enhanced.

The thus formed end structure 50 is joined to the end beam 26 and the upper face plate 55 connected to the slide center beam 43, and is disposed at the end portion of the vehicle body 11 through the crushable zone 40 which is disposed at the vestibule 13 portion. At the upper and lower sides of this crushable zone 40, a lower slide portion 41 and an upper slide portion 42 are disposed.

The lower slide portion 41 is connected to the central portion in the width directions of the end beam 26. The slide center beam 43, which is disposed so as to horizontally project in a substantially T letter-shape in a planar view toward the direction of the cap beam 22, is disposed so as to be slidable in the vehicle body front and back directions through support members 43*a*, 44*a* with respect to a guide center beam 44 projecting horizontally toward the direction of the vehicle end from the cap beam 22, and is connected by a lower fuse member which is designed so as to be broken when the load exceeds a preliminary set value.

The upper slide portion 42 is provided with slide bars 47 which horizontally project along lintel portions 33*a* of the door frame portion 33 from both end portions of the upper reinforcement beam 56, and guide frames 48 disposed at the upper portions of the door pocket portions 37. The slide bar 47 is disposed so as to be slidable in the vehicle body front and back directions with respect to the guide frame 48, and similar to the lower slide portion 41, the slide bar 47 and the guide frame 48 are connected with each other by an upper fuse member which is designed so as to be broken when the load exceeds a preliminary set value.

Each of the fuse members is a member having strength for bearing preliminary set tensile load and compressive load. The strength of the fuse member is set such that the fuse member is not permanently deformed or broken by the normal tensile load or compressive load which is applied when a plurality of railway vehicles are used by connecting with one another by the couplers 59, and is broken when an excessive load over the preliminary set load is applied by a collision. Namely, when the fuse member is broken due to an application of an excessive load, the slide center beam 43 and the slide bar 47 become slidable with respect to the guide center beam 44 and the guide frame 48 so that energy is absorbed by crushing a plurality of shock absorption members 45 disposed in the underframe 20.

The strength of respective members disposed at the vestibule portion, for example, the strength at the vestibule portions of the door frame portion 33, the floor board 17, and the roof structure 60, is set at strength lower than the strength of the fuse member, such that when the fuse member is broken by an application of an excessive load, the vestibule portions of the door frame portion 33, the floor board 17, and the roof structure 60 are deformed at the same time of the break of the fuse member.

The shock absorption member 45 can be made by combining, for example, four long shock absorbers 45*a* made of square pipes each having the same shape of square cross-section and two short shock absorbers 45*b* each having a length shorter than the length of the long shock absorber 45*a* so as to make the axes of the respective shock absorbers 45*a*, 45*b* parallel with each other. The proximal end of each of the shock absorbers 45*a*, 45*b* is integrally joined to a mounting plate 45*c*. The mounting plate 45*c* is mounted on the end faces of the cap beam 22 and the guide center beam 44, and the axes of the respective shock absorbers 45*a*, 45*b* are disposed so as to be oriented in the vehicle body front and back directions. At the distal end of each of the shock absorbers 45*a*, 45*b*, cutout portions 45*d* are respectively formed in the distal edges of a set of opposing faces between two sets of opposing faces. The respective shock absorbers 45*a*, 45*b* are combined such that the respective cutout portions 45*d* themselves are not adjacent to each other.

Thus formed shock absorber 45 is deformed at the time of collision first at the opposing edges of the long shock absorber 45*a* where the cutout portion 45*d* is not disposed. Subsequently, the opposing edges of the short shock absorber 45*b* where the cutout portion 45*d* is not disposed start to be deformed by an application of collision. The deformations of the respective shock absorbers 45*a*, 45*b* are continuously repeated toward the proximal end side while mutually influencing the wall face of adjacent shock absorber. With this, a shock can be absorbed by continuously making the wall faces of the respective shock absorbers 45*a*, 45*b* buckled into a bellows-like state. Moreover, because a plurality of shock absorbers are disposed and joined in the width directions and the vertical directions, the bending rigidity of the shock absorption member 45 is enhanced so that the intermediate portion can be prevented from being bent, thereby the collision energy can be surely absorbed.

Thus, the end beam 26, to which the lower portion of the end structure 50 is joined, is held so as to be slidable in the vehicle body front and back directions by the lower slide portion 41 which is formed by the slide center beam 43 and the guide center beam 44. The upper reinforcement beam 56 disposed at the upper portion of the end structure 50 is held so as to be slidable in the vehicle body front and back directions by the upper slide portion 42 which is formed by the slide bar 47 and the guide frame 48 which are disposed on both sides of the vehicle body. The end beam 26 and the upper reinforcement beam 56 are rigidly connected with each other by the end post 53 and the corner post 54. Moreover, at the lower portion of the end post 53 and the corner post 54, the post reinforcement members 57, 58 are respectively disposed for enhancing the rigidities of the end post 53 and the corner post 54. Accordingly, the end beam 26, the upper reinforcement beam 56, the end post 53, and the corner post 54 are rigidly joined to one another, and the end post 53 and the corner post 54 are disposed at the front faces of the end beam 26 and the upper reinforcement beam 56, thereby the end structure 50 becomes a state of being rigidly assembled in a frame.

With this, even when large external force is applied from the front direction to the end structure 50, large external force is applied from an oblique direction to the end structure 50, and/or large external force is applied to a part of the end structure 50, the external force can be born by the entire end structure 50, and the end structure 50 can be moved parallel to the vehicle body backward direction by the lower slide portion 41 and the upper slide portion 42, thereby, the end structure 50 is prevented from falling down toward the cabin 14.

Moreover, the end post 53 and the corner post 54 are joined to the upper reinforcement beam 56 and the outer face of the end beam 26 so that external force applied to the end post 53 and the corner post 54 can be surely transmitted to the upper reinforcement beam 56 and the end beam 26. The lower end of the lower portion of the corner post reinforcement member 58 is joined to the upper face of the projecting piece 26a, and the side face of the lower end portion thereof is joined to the outer face of the end beam 26, so that the joining strength between the corner post reinforcement member 58 and the end beam 26 can be enhanced, compared with the case in which the corner post reinforcement member 58 is disposed so as to stand on the upper face of the end beam 26. Thereby, external force to the end face can be effectively transmitted to the entire end structure 50 and the end beam 26.

Therefore, regardless of the application direction of external force applied to the end structure 50 and the application position thereof, the end structure 50 can be moved parallel to the vehicle body backward direction while the vestibule 13 portion, which is a crushable zone, is being deformed. Therefore, external force is applied to the shock absorption member 45 in the axial directions of the respective shock absorbers 45a, 45b. Thereby, as mentioned above, the respective shock absorbers 45a, 45b can be surely deformed to be buckled so that the external force absorbing effect by the shock absorption member 45 can be fully used. Thus, the cabin 14 can be protected by deforming only the vestibule 13 portion which is disposed at the vehicle end portion so as to absorb collision energy.

Moreover, the lower end of the side post 31 of the side structure 30 is joined to the upper face portion of the projecting piece 21a which is disposed at the side beam 21 of the underframe 20, and the lower inner face of the side post 31 is joined to the outer face portion 21b of the side beam 21. Thereby, the external force applied to the side structure 30 from the side of the vehicle body can be born by the outer face portion 21b of the side beam 21 through the lower end portion of the side post 31. Accordingly, the joining strength between the side post 31 and the side beam 21 can be enhanced, compared with the case in which the lower end of the side post 31 is joined to the upper face of the side beam 21, and the underframe 20 and the side structure 30 can be rigidly joined to each other. Thereby, the deformation of the side structure 30 toward the inside of the vehicle body can be suppressed even when large external force is applied to the side face portion of the vehicle body. Moreover, the external force applied to the roof structure 60 from above can be born by the projecting piece 21a of the side beam 21 through the side post 31, so that the deformation of the roof structure 60 toward the inside of the vehicle body by external force from above can be suppressed.

The end post 53 and the corner post 54 are assembled with the respective post reinforcement members 57, 58 by inserting the respective post reinforcement members 57, 58 into the insides of the end post 53 and the corner post 54 through the openings 53a, 54a which are formed at the vehicle body inner sides of the end post 53 and the corner post 54, so that the end structure 50 can be assembled by moving the same in the horizontal direction. With this, the end structure 50 and the underframe 20 can be combined under a state in which the end post 53 and the corner post 54 are preliminary assembled into the end structure 50 which can have various vehicle body cross-sections, so that the respective post reinforcement members 57, 58 can be easily assembled with the end post 53 and the corner post 54. Moreover, an end structure whose end post 53 and corner post 54 are inclined can be addressed.

Note that, at the front head portion of the vehicle body, a driver's cab and a crew's room are disposed at the vestibule 13 portion, and a hood and a marker light, etc. are disposed at the end face. The end post 53 can be disposed at a suitable position according to the existence or non-existence of the connection door 18 or the shape of the end face window 19, and can be single. Moreover, suitable configurations can be adopted for the configuration of the shock absorption member 45 and the configurations of the respective connection members 46 and the upper connection member 49.

REFERENCE SIGNS LIST

11 . . . vehicle body, 12 . . . passenger door, 13 . . . vestibule, 14 . . . cabin, 15 . . . side window, 16 . . . wheel, 17 . . . floor board, 18 . . . connecting door, 19 . . . end face window, 20 . . . underframe, 21 . . . side beam, 21a . . . projecting piece, 21b . . . outer face portion, 22 . . . cap beam, 23 . . . center beam, 24 . . . transverse beam, 25 . . . rocker rail, 26 . . . end beam, 26a . . . projecting piece, 26b . . . slit, 30 . . . side structure, 31 . . . side post, 32 . . . frame member, 33 . . . door frame portion, 33a . . . lintel portion, 34 . . . window frame portion, 35 . . . wainscot panel, 36 . . . skin panel, 37 . . . door pocket portion, 40 . . . crushable zone, 41 . . . lower slide portion, 42 . . . upper slide portion, 43 . . . slide center beam, 44 . . . guide center beam, 45 . . . shock absorption member, 45a . . . long shock absorber, 45b . . . short shock absorber, 45c . . . mounting plate, 45d . . . cutout portion, 47 . . . slide bar, 48 . . . guide frame, 50 . . . end structure, 51 . . . opening frame portion for door, 52 . . . opening frame portion for window, 52a . . . reinforcement member, 53 . . . end post, 54 . . . corner post, 53a, 54a . . . opening, 53b, 54b . . . joining hole, 53c, 54c . . . reinforcement angle, 55 . . . upper face plate, 56 . . . upper reinforcement beam, 57 . . . end post reinforcement member, 58 . . . corner post reinforcement member, 59 . . . coupler, 59a . . . coupler support frame, 60 . . . roof structure, 61 . . . cant rail, 62 . . . rafter, 63 . . . shingle, 64 . . . horn

The invention claimed is:

1. A railway vehicle which is configured by joining an underframe, side structures, end structures, and a roof structure, so as to form a vehicle body, wherein a lower inner face of a post member of the side structure or the end structure is joined to an outer face portion of the underframe, wherein a projecting piece is disposed on an outer face side of the underframe so as to project toward an outside of the vehicle body, and a lower end of the post member flushly contacts and is joined to an upper face portion of the projecting piece.

2. The railway vehicle according to claim 1, wherein the post member is a side post of the side structure which is joined to a side beam of the underframe.

3. The railway vehicle according to claim 2, wherein the projecting piece is disposed so as to project from an intermediate position in vertical directions on the outer face side of the underframe toward an outside of the vehicle body, a slit is formed in the projecting piece so as to receive a lower portion of the post member, and the lower end portion of the post member is mechanically joined to an outer face portion of the underframe through the slit so that external force applied from above to the post member is also born by the underframe.

4. The railway vehicle according to claim 2, wherein a projecting piece is disposed on an outer face side of the underframe so as to project toward an outside of the vehicle body, and a lower end of the post member is joined to an upper face portion of the projecting piece. underframe.

5. The railway vehicle according to claim 1, wherein the post member is a post member of the end structure which is joined to an end beam of the underframe.

6. The railway vehicle according to claim 5, wherein a projecting piece is disposed on an outer face side of the underframe so as to project toward an outside of the vehicle body, and a lower end of the post member is joined to an upper face portion of the projecting piece.

7. The railway vehicle according to claim 5, wherein the projecting piece is disposed so as to project from an intermediate position in vertical directions on the outer face side of the underframe toward an outside of the vehicle body, a slit is formed in the projecting piece so as to receive a lower portion of the post member, and the lower end portion of the post member is mechanically joined to an outer face portion of the underframe through the slit so that external force applied from above to the post member is also born by the underframe.

8. The railway vehicle according to claim 1, wherein the post member includes a post reinforcement member for reinforcing the post member of the end structure which is joined to an end beam of the underframe.

9. The railway vehicle according to claim 8, wherein the projecting piece is disposed so as to project from an intermediate position in vertical directions on the outer face side of the underframe toward an outside of the vehicle body, a slit is formed in the projecting piece so as to receive a lower portion of the post member, and the lower end portion of the post member is mechanically joined to an outer face portion of the underframe through the slit so that external force applied from above to the post member is also born by the underframe.

10. The railway vehicle according to claim 8, wherein the post reinforcement member has a height which is ½ with respect to a height of the post member of the end structure.

11. The railway vehicle according to claim 10, wherein a projecting piece is disposed on an outer face side of the underframe so as to project toward an outside of the vehicle body, and a lower end of the post member is joined to an upper face portion of the projecting piece.

12. The railway vehicle according to claim 10, wherein the projecting piece is disposed so as to project from an intermediate position in vertical directions on the outer face side of the underframe toward an outside of the vehicle body, a slit is formed in the projecting piece so as to receive a lower portion of the post member, and the lower end portion of the post member is mechanically joined to an outer face portion of the underframe through the slit so that external force applied from above to the post member is also born by the underframe.

13. The railway vehicle according to claim 8, wherein a projecting piece is disposed on an outer face side of the underframe so as to project toward an outside of the vehicle body, and a lower end of the post member is joined to an upper face portion of the projecting piece.

14. The railway vehicle according to claim 1, wherein a projecting piece is disposed so as to project from an intermediate position in vertical directions on an outer face side of the underframe toward an outside of the vehicle body, a slit is formed in the projecting piece so as to receive a lower portion of the post member, and a lower end portion of the post member is mechanically joined to an outer face portion of the underframe through the slit so that external force applied from above to the post member is also born by the underframe.

15. A railway vehicle comprising:
an elongated underframe having: opposing outer face sides with outer face portions; and projecting pieces projecting from an intermediate position in vertical directions on the outer face sides toward an outside of the railway vehicle, wherein the projecting pieces form slits;
wheels depending from the elongated underframe;
opposing side structures extending upward from the elongated underframe along a length of the elongated underframe, wherein each side structure includes a post member and each post member has: a lower portion inserted in the respective slit; a lower inner face joined to the outer face portion of the elongated underframe; and a lower end portion; and
a roof structure coupled to the opposing side structures,
wherein the lower end portions of the post members are mechanically joined to the outer face portions of the underframe through the slits so that external force applied to the post members is born by the underframe.

16. A railway vehicle comprising:
an elongated underframe having: opposing outer face sides with outer face portions; and projecting pieces projecting from an intermediate position in vertical directions on the outer face sides toward an outside of the railway vehicle, wherein the projecting pieces form slits; and
opposing end structures extending upward from the elongated underframe along a width of the elongated underframe, wherein each end structure includes a post member and each post member has: a lower portion inserted in the respective slit; a lower inner face joined to the outer face portion of the elongated underframe; and a lower end portion,
wherein the lower end portions of the post members are mechanically joined to the outer face portions of the underframe through the slits so that external force applied to the post members is transmitted to the underframe.

17. A railway vehicle as recited in claim 16, further comprising:
- opposing side structures extending upward from the underframe along a length of the elongated underframe, each side structure having a side post member; and
- wheels depending from the elongated underframe.

18. A railway vehicle as recited in claim 17, wherein a projecting piece is disposed so as to project from an intermediate position in vertical directions on an outer face side of the underframe toward an outside of the vehicle body, a slit is formed in the projecting piece so as to receive a lower portion of the side post member, and a lower end portion of the side post member is mechanically joined to an outer face portion of the underframe through the slit so that external force applied to the side post member is transmitted to the underframe.

\* \* \* \* \*